US009776303B2

(12) United States Patent
Klett et al.

(10) Patent No.: US 9,776,303 B2
(45) Date of Patent: Oct. 3, 2017

(54) ABRASIVE ARTICLE REINFORCED BY DISCONTINUOUS FIBERS

(71) Applicants: SAINT-GOBAIN ABRASIVES, INC., Worcester, MA (US); SAINT-GOBAIN ABRASIFS, Conflans-Sainte-Honorine (FR)

(72) Inventors: Michael W. Klett, Holden, MA (US); Frank J. Csillag, Hopkinton, MA (US); Steven F. Parsons, Saint Augustine, FL (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 588 days.

(21) Appl. No.: 14/317,117

(22) Filed: Jun. 27, 2014

(65) Prior Publication Data
US 2015/0000204 A1    Jan. 1, 2015

Related U.S. Application Data

(60) Provisional application No. 61/840,906, filed on Jun. 28, 2013.

(51) Int. Cl.
*B24D 5/04* (2006.01)
*B24D 7/04* (2006.01)
(Continued)

(52) U.S. Cl.
CPC .............. *B24D 5/04* (2013.01); *B24D 3/20* (2013.01); *B24D 3/344* (2013.01); *B24D 7/04* (2013.01); *C03C 25/50* (2013.01)

(58) Field of Classification Search
CPC ... B24D 5/00; B24D 5/04; B24D 3/00; B24D 3/20; B24D 7/00; B24D 7/04;
(Continued)

(56) References Cited

U.S. PATENT DOCUMENTS 3,030,743 A *  4/1962 Raymond ............... B24D 7/04
                                                   451/544
3,838,543 A    10/1974 Lakhani
(Continued)

FOREIGN PATENT DOCUMENTS

CN   101817171 A   9/2010
CN   202726754 U   2/2013
(Continued)

OTHER PUBLICATIONS

JG Williams (Fracture Mechanics of Polymers, Ellis Horwood Ltd, chapter 4 (1984)).
(Continued)

*Primary Examiner* — Kaj K Olsen
*Assistant Examiner* — Alexandra M Moore
(74) *Attorney, Agent, or Firm* — Abel Law Group, LLP; Thomas Osborn

(57) ABSTRACT

An abrasive article has an abrasive portion and chopped strand fibers (CSF) with enhanced strength and/or fracture of toughness. The CSF may be coated with a thermoplastic having a loss on ignition of at least about 2 wt %. The CSF can have a primary coating and a secondary coating on the primary coating. At least some of the CSF can have a length of at least about 6.3 mm.

13 Claims, 5 Drawing Sheets

(51) Int. Cl.
    *B24D 3/20*     (2006.01)
    *B24D 3/34*     (2006.01)
    *C03C 25/50*     (2006.01)

(58) Field of Classification Search
    CPC ..... B24D 11/001; C09K 3/1409; B23B 27/20; B24B 37/24
    See application file for complete search history.

(56) References Cited

U.S. PATENT DOCUMENTS

| | | | |
|---|---|---|---|
| 4,364,746 A * | 12/1982 | Bitzer | B24D 3/344 |
| | | | 51/296 |
| 4,918,116 A | 4/1990 | Gardziella et al. | |
| 4,961,757 A * | 10/1990 | Rhodes | B23B 27/148 |
| | | | 501/128 |
| 5,611,827 A | 3/1997 | Hammarstrom et al. | |
| 5,861,203 A | 1/1999 | Yuan et al. | |
| 6,299,508 B1 | 10/2001 | Gagliardi et al. | |
| 6,352,567 B1 | 3/2002 | Windisch et al. | |
| 6,419,981 B1 * | 7/2002 | Novich | C03C 25/00 |
| | | | 427/180 |
| 6,749,496 B2 | 6/2004 | Mota | |
| 6,846,573 B2 | 1/2005 | Seydel | |
| 6,942,561 B2 | 9/2005 | Mota | |
| 2002/0184829 A1 | 12/2002 | Lemberger et al. | |
| 2005/0025967 A1 | 2/2005 | Lawton et al. | |
| 2008/0143010 A1 | 6/2008 | Kashikar et al. | |
| 2010/0159806 A1 | 6/2010 | Wu et al. | |
| 2010/0180512 A1 * | 7/2010 | Arnaud | B24D 3/34 |
| | | | 51/298 |
| 2010/0190424 A1 | 7/2010 | Francois et al. | |
| 2012/0100784 A1 | 4/2012 | Klett | |
| 2012/0289125 A1 | 11/2012 | Billig et al. | |
| 2012/0297693 A1 | 11/2012 | Zuyev et al. | |

FOREIGN PATENT DOCUMENTS

| | | |
|---|---|---|
| EP | 0577805 B1 | 3/1997 |
| EP | 0739264 B1 | 8/1998 |
| EP | 0997231 A2 | 5/2000 |
| EP | 0842013 B1 | 8/2000 |
| EP | 1259355 A1 | 11/2002 |
| EP | 0789641 B1 | 2/2005 |
| EP | 0874717 B1 | 8/2005 |
| EP | 1395395 B1 | 10/2005 |
| EP | 0988341 B1 | 5/2006 |
| EP | 1907476 A1 | 4/2008 |
| EP | 1968476 A1 | 9/2008 |
| EP | 2059368 A1 | 5/2009 |
| EP | 2237924 A1 | 10/2010 |
| EP | 1954445 B1 | 6/2015 |
| GB | 2028860 A | 3/1980 |
| JP | 2003-311630 A | 11/2003 |
| WO | 95-20469 A1 | 8/1995 |
| WO | 9855545 A1 | 12/1998 |
| WO | 2007005452 A1 | 1/2007 |
| WO | 2007079168 A1 | 7/2007 |
| WO | 2008034056 A1 | 3/2008 |
| WO | 2009079639 A1 | 6/2009 |
| WO | 2012092610 A1 | 7/2012 |

OTHER PUBLICATIONS

U.S. Appl. No. 14/317,163, filed Jun. 27, 2014, Inventors: Xiangbin Yu, et al.
International Search Report for PCT/US2014/044515 dated Oct. 21, 2014, 8 pgs.
International Search Report for PCT/US2014/044539 dated Oct. 28, 2014, 4 pgs.
Victor C. Li and Hwai-Chung Wu, Conditions for pseudo strain-hardening in fiber reinforced brittle matrix composites, Applied mechanics review, vol. 45,No. 8,pp. 390-398, 1991.
Victor C. Li etal, A micromechanical model of tension-softening and bridging toughening of short random fiber reinforced brittle matrix composites, Journal of the mechanics and physics in solids, vol. 39, No. 5,pp. 607-625,1991.
Victor C. Li, Postcrack scaling relations for fiber reinforced cementitious composites, Journal of materials in civil engineering, vol. 4, No. 1 pp. 41-57,1992.
Zhong Lin and Victor C. Li, Crack bridging in fiber reinforced cementitious composites with slip-hardening interfaces, Journal of the mechanics and physics in solids, vol. 45,No. 5,pp. 763-787,1997.
U.S. Appl. No. 14/317,340, filed Jun. 27, 2014.

\* cited by examiner

ABRASIVE ARTICLE REINFORCED BY DISCONTINUOUS FIBERS

This application claims priority to and the benefit of U.S. Prov. Pat. App. No. 61/840,906, filed Jun. 28, 2013, and is incorporated herein by reference in its entirety.

BACKGROUND OF THE INVENTION

Field of the Disclosure

The present invention relates in general to abrasive wheels and, in particular, to a system, method and apparatus for abrasive articles having improved work of fracture properties.

Description of the Related Art

Phenolic-based resins used to manufacture grinding wheels are inherently brittle materials that are subject to failure due to the probability of defects within the part. Reinforcements are therefore used in most wheels to preclude brittle and catastrophic failure.

One such reinforcement is a fiber glass web or fabric of various weights and styles. The webs are designed to increase the fracture toughness or work of fracture of the wheel, which ultimately prevents the explosive release of wheel fragments in the event that the wheel breaks during use. The web comprises a plurality of individual yarns or strands woven into a 0°/90° open structured fabric. Once the fabric is formed, it is dipped in a phenolic resin and subsequently dried and cured to form a thermosetting coating. Once the coating is cured to the desired level, the web is wound into a roll for easy storage until needed. The final step in preparing the web for use in the wheel is unwinding the roll and cutting individual discs having the desired dimensions. The process is labor and time intensive, generates significant waste and is therefore expensive. This basic process has been used for more than 50 years.

Chopped strand fibers also have been used to reinforce resin-based grinding wheels. The chopped strand fibers may comprise fiber bundles or strands, typically 3 to 4 mm in length and include many individual filaments. The number of filaments can vary depending on the manufacturing process but typically is in a range of about 400 to 6000 filaments per bundle or strand. The filaments are held together by an adhesive known as a sizing, binder, or coating that should ultimately be compatible with the resin matrix. The sizing comprises less than 2 wt % of the fiber. The amount of sizing or coating is limited by the fiber manufacturing processes used to make direct sized yarn or chopped strand products. One example of a chopped strand fiber is referred to as 183 Cratec®, available from Owens Corning.

Incorporation of chopped strand fibers into a dry grinding wheel mix is generally accomplished by blending the chopped strand fibers, resin, fillers, and abrasive particles for a specified time and then molding, curing, or otherwise processing the mix into a finished grinding wheel.

Traditional chopped strand fiber reinforced wheels can suffer from a number of problems, including lower strength, poor grinding performance and shorter wheel life, presumably due to incomplete dispersal of the filaments within the chopped strand fiber bundle, poor adhesion between the wheel matrix resin and the chopped strand bundle, fiber length degradation, or a combination of all of these. However, another deficiency for chopped strand reinforcements can be their low fracture toughness contribution to the composites or wheels relative to glass fiber webs. There is a need, therefore, for improved reinforcement techniques for abrasive processing tools without compromising performance.

SUMMARY

Embodiments of grinding wheels reinforced by discontinuous fibers are disclosed. For example, an abrasive article may comprise an abrasive portion having an organic bond and abrasive particles. The abrasive article may have a reinforcement including chopped strand fibers (CSF) coated with a thermoplastic coating having a loss on ignition (LOI) of at least about 2.4 wt %. In other embodiments, the abrasive article can have a reinforcement that includes CSF coated with a primary coating and a secondary coating on the primary coating. In still other embodiments, the abrasive article can have a reinforcement that includes at least some CSF that have a length of at least about 6.3 mm.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
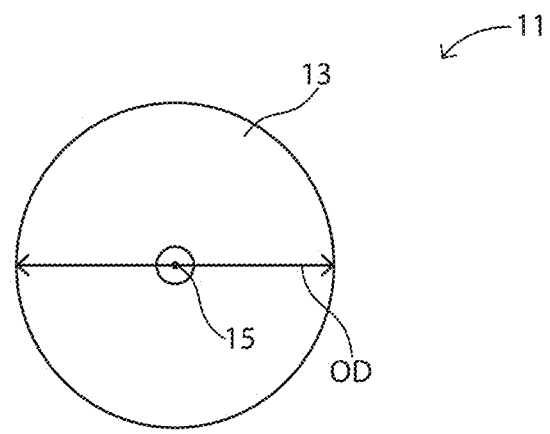
FIGS. 1 and 2 are schematic side and edge views of an embodiment of an abrasive article.

Embodiments of a system, method and apparatus for grinding wheels reinforced by discontinuous fibers are disclosed. For example, an abrasive article 11 (FIGS. 1 and 2) may comprise an abrasive body 13 having an axis 15. In some versions, the abrasive body 13 may have an outer diameter (OD) and an axial thickness (AT).

Figure 3A:
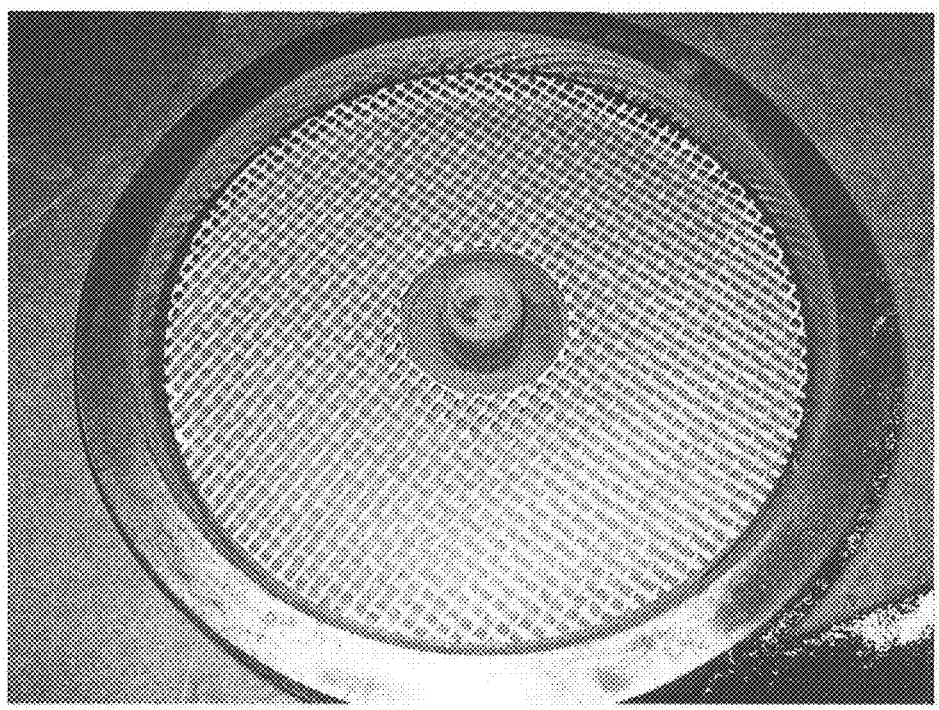
FIGS. 3A and 3B are images of conventional and CSF wheel subassemblies, respectively.
Figure 3B:
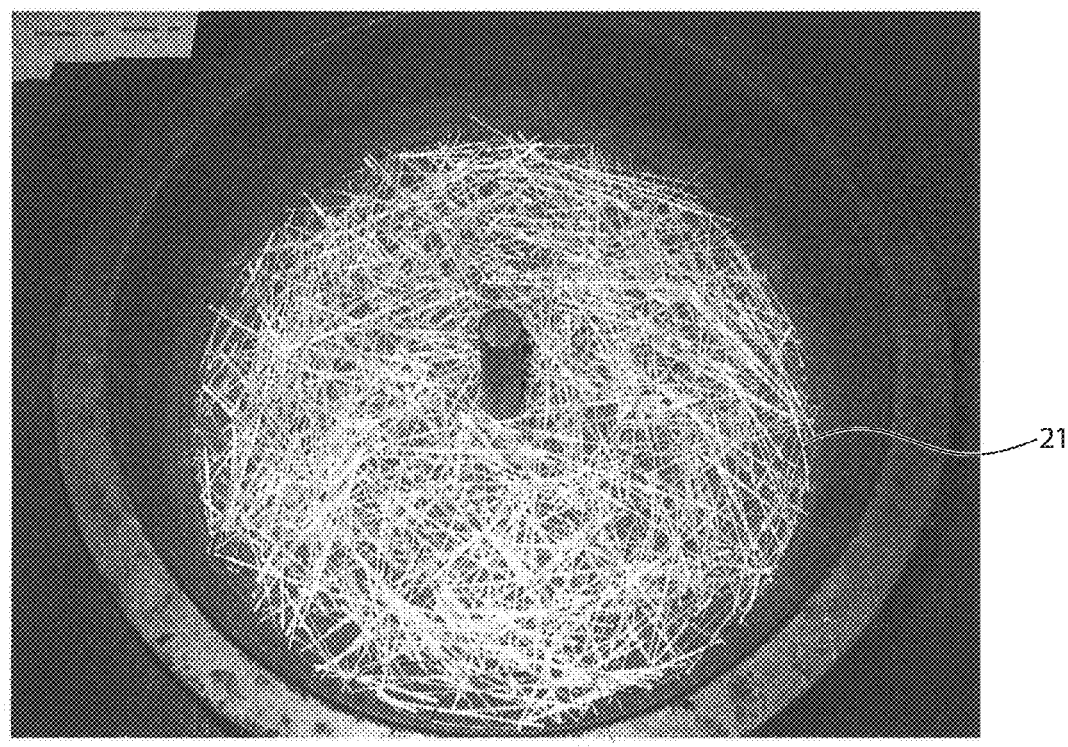

Embodiments of the abrasive body 13 may comprise an abrasive mix 17 comprising an organic bond and abrasive particles. The abrasive body may further comprise a reinforcement 19 comprising discontinuous fibers 21 (FIG. 3B). For example, the discontinuous fibers 21 may comprise chopped strand fibers (CSF).

Figure 4:
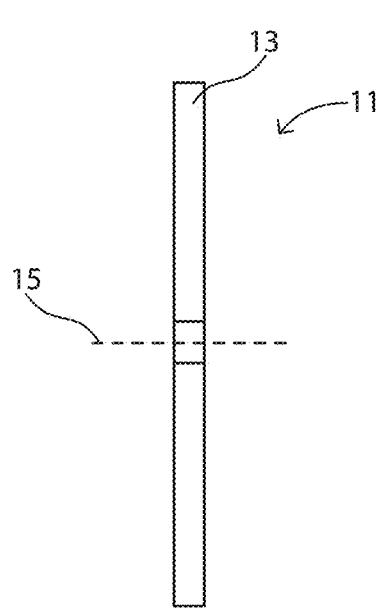
FIGS. 4-6 are edge views of alternate embodiments of abrasive articles.

The discontinuous fibers 21 may be dispersed in the abrasive body 13 (FIG. 4). In one example, the discontinuous fibers 21 may be dispersed throughout the abrasive body 13, such that the discontinuous fibers 21 are substantially randomly distributed throughout the abrasive body 13 and do not form a separate layer.

Figure 2:
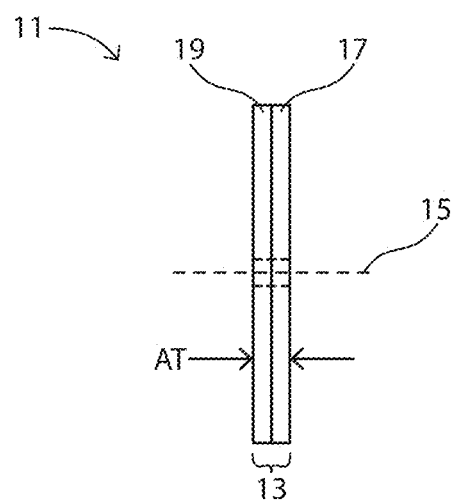

As depicted in FIGS. 2 and 3B, the discontinuous fibers 21 also may be formed as part of a discrete layer or as a discrete layer 19. For example, the discontinuous fibers 21 may comprise a pre-formed chopped strand fiber mat. Alternatively, the fibers may be chopped directly into a mold, or pre-chopped and then added to the mold. The abrasive article 11 may comprise an abrasive portion 13 comprising an organic bond material and abrasive particles dispersed in the organic bond material. A discrete layer 19 of chopped strand fibers (CSF) may be located at least partially in the organic bond material and coupled (e.g., chemically and mechanically bonded) to the abrasive portion 13 for reinforcement thereof. In some versions, the discrete layer can be a sintered mat of the CSF such that the CSF are integral.

Figure 5:
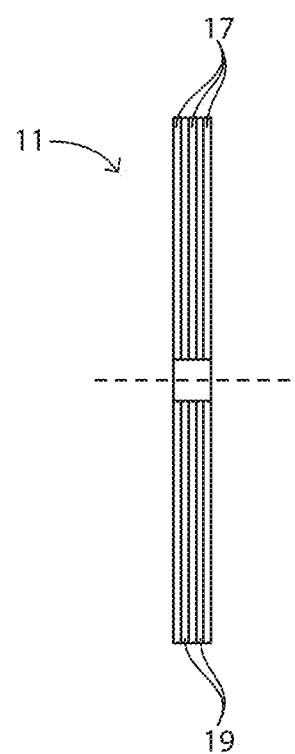

In other examples, the discrete layer 19 may comprise a plurality of discrete layers 19 (FIG. 5) that are axially separated from each other by portions or layers of the abrasive mix 17. The abrasive portion 17 may comprise at least two abrasive layers, such that one or more discrete layers 19 are located and extend axially between said at least two abrasive layers.

Figure 6:
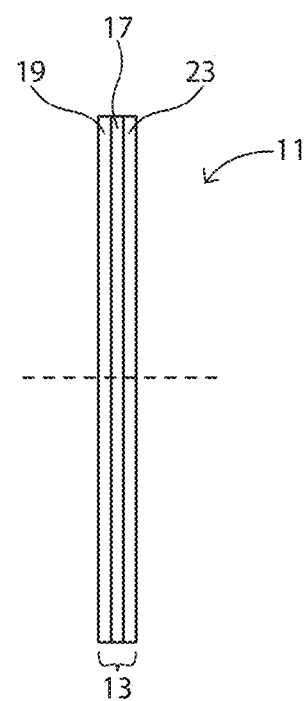

In some versions, the abrasive body 13 does not have a continuous fiber reinforcement web, such that the abrasive body 13 is reinforced only by the discontinuous fibers 21. Other versions of the abrasive article 11 may further comprise at least one continuous fiber reinforcement web 23 (FIG. 6) in the abrasive body 13, such that the abrasive body 13 is reinforced by the discontinuous fibers 21 and the continuous fiber reinforcement web 23.

Figure 7:
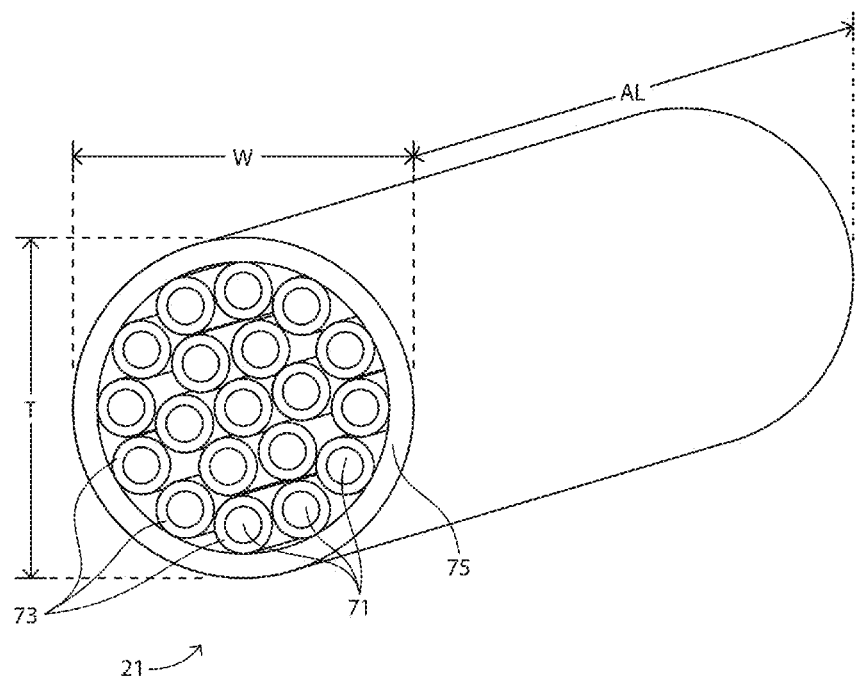
FIG. 7 is a schematic isometric view of an embodiment of a strand of discontinuous fibers.

FIG. 7 schematically illustrates an embodiment of a strand of discontinuous fibers 21. In reality, the shapes, numbers and relative sizes of the strand, filaments and coatings can vary, depending on the application. The strand may comprise a substantially cylindrical or rounded sectional shape, such as oval or elliptical shapes. The strand may include individual filaments 71. Each individual filament may include a coating 73, such as a primary coating, described elsewhere herein. Collectively, the strand of coated individually coated filaments 71 may include a secondary coating 75, as shown and described elsewhere herein.

The strand of discontinuous fibers 21 may include a sectional aspect ratio of width W to thickness T. The sectional aspect ratio can be in a range of about 1:1 to about 3:1. For example, the sectional aspect ratio may be about 1.75:1 to about 2.75:1, or even about 2:1 to about 2.5:1.

In some embodiments, the strand of discontinuous fibers 21 may comprise a width W (e.g., a radial width) of at least about 0.1 mm. For example, the radial width may be at least about 0.2 mm, such as at least about 0.3 mm. In other versions, the radial width can be not greater than about 0.5 mm, such as not greater than about 0.4 mm, not greater than about 0.3 mm, or even not greater than about 0.2 mm. The width may be in a range between any of the minimum and maximum values.

Embodiments of the strand of discontinuous fibers 21 may comprise an axial length AL of at least about 6 mm. In other versions, the AL may be at least about 7 mm, such as at least about 8 mm, at least about 10 mm, at least about 15 mm, or even at least about 20 mm. Still other versions of the AL can be not greater than about 150 mm, such as not greater than about 100 mm, not greater than about 75 mm, not greater than about 50 mm, not greater than about 40 mm, or even not greater than about 30 mm. The AL may be in a range between any of these minimum and maximum values.

Embodiments of the strand of discontinuous fibers 21 may have an aspect ratio of axial length AL to radial width W of at least about 10. For example, the aspect ratio may be at least about 12, such as at least about 25, such as at least about 50, at least about 75, at least about 100, at least about 250, or even at least about 500. In other versions, the aspect ratio can be not greater than about 1500, such as not greater than about 1000, not greater than about 750, not greater than about 500, not greater than about 250, not greater than about 200, or even not greater than about 150. The aspect ratio may be in a range between any of these minimum and maximum values.

In one example, the abrasive articles may include comprises a thermosetting phenolic resin and reinforcing fillers having an aspect ratio (l/d) equal to or greater than about 10.

Embodiments of the abrasive body 13 may comprise a volume percentage of the discontinuous fibers 21 of at least about 1 vol %. For example, the volume percentage of the discontinuous fibers can be at least about 2 vol %, such as at least about 3 vol %, at least about 4 vol %, at least about 5 vol %, at least about 6 vol %, or even at least about 9 vol %. In other versions, the volume percentage of the discontinuous fibers can be not greater than about 25 vol %, such as not greater than about 20 vol %, or even not greater than about 15 vol %. The volume percentage of the discontinuous fibers can be in a range between any of these minimum and maximum values.

In other examples, the abrasive article can comprise about 25 vol % to about 50 vol % of the organic bond material. In another example, the abrasive article can comprise about 40 vol % to about 70 vol % of the abrasive particles. In still another example, the abrasive article can comprise about 6 vol % to about 12 vol % of the discontinuous fibers.

Other embodiments of an abrasive article may comprise a reinforcement in the abrasive article. For example, the reinforcement can comprise CSF coated with a coating. The coating can be cross-linked, such as at a low level. In other versions, less than about 10%, or even less than about 5% of the coating can be cross-linked. The coating may include a thermoplastic coating. The thermoplastic coating may comprise a high hydrogen-bonding capacity. For example, a thermoplastic polymer -(A-B)- made with monomers A and B, where the B segment of the polymer contains at least one XHn functionalities, where X=O or N or S, and n=1 or 2. The coating may comprise one or more of a thermoplastic, thermoplastic phenolic, phenoxy, polyurethane and novolac.

In another version, the thermoplastic coating may be partially crosslinked using conventional crosslinking agents. Such crosslinking agents may include hexamethylenetetramine, formaldehyde, epoxy, isocyanate, etc. The extent of crosslinking can be small, such as less than about 10% of the coating can be cross-linked.

The CSF 21 (FIG. 7) can have a primary coating 73 and a thermoplastic coating that can be a secondary coating 75 on the primary coating 73. For example, the CSF can have a direct sized coating 73, and the thermoplastic coating can be a secondary coating 75 on the direct sized coating 73. The direct sized coating can have a loss on ignition (LOI), which may be defined as the st % of the coating relative to the total weight of the CSF. For example, the LOI can be less than about 2 wt %, such as less than or equal to about 1 wt %.

Other embodiments of the reinforcement can have a LOI of at least about 2 wt %. In some examples, the LOI can be at least about 3 wt %, such as at least about 5 wt %, at least about 7 wt %, at least about 9 wt %, at least about 12 wt %, or even at least about 15 wt %. Alternate embodiments of the LOI can be not greater than about 25 wt %, such as not greater than about 20 wt %, not greater than about 15 wt %, or even not greater than about 12 wt %. The LOI may be in a range between any of these minimum and maximum values.

Another embodiment of an abrasive article may comprise a reinforcement comprising CSF, at least some of which can have an initial length (i.e., prior to final processing of the abrasive article) of at least about 6.3 mm (0.25 inches). Alternatively, the length of the CSF can be at least about 6.3 mm, such as at least about 7 mm, at least about 8 mm, at least about 10 mm, at least about 12 mm, at least about 15 mm, or even at least about 20 mm. In other versions, the length of the CSF can be not greater than about 125 mm, such as not greater than about 100 mm, not greater than about 75 mm, not greater than about 50 mm, not greater than about 40 mm, or even not greater than about 30 mm. The CSF length may be in a range between any of these minimum and maximum values.

In some embodiments, the CSF may comprise a yield in a range of about 134 TEX (3700 yd/lb) to about 1830 TEX (271 yd/lb). In other versions, the CSF may comprise a yield of at least about 125 TEX, such as at least 250 TEX, at least 500 TEX, at least 750 TEX, at least 1000 TEX, or even at least 1500 TEX. Other embodiments of the CSF may comprise a yield of not greater than about 2000 TEX, such as not greater than about 1500 TEX, not greater than about 1000 TEX, not greater than about 750 TEX, not greater than about 500 TEX, or even not greater than about 250 TEX. The yield may be in a range between any of these minimum and maximum values.

In some embodiments, the abrasive article does not have a continuous fiber reinforcement, such that the abrasive article is reinforced only by the CSF. However, in other versions, the abrasive article may further comprise at least one web formed from continuous fiber reinforcement, such that the abrasive body is reinforced by the CSF and the web.

The terms $G_{1C}$ (toughness) and work-of-fracture (wof) may be used to measure the crack initiation-energy and crack-propagation stability, respectively. The $G_{1C}$ value may be determined by measuring the point at which the crack initiates in a bar with a pre-existing flaw. The wof may be calculated by measuring the total energy it takes to propagate the crack through the entire specimen. The test employs a single-edge-notch (SEN) geometry. The width of the specimen (about 0.5"-1.5") depends on the number and spacing of the webs. A 0.14" notch may be cut along an edge of the bar with a 0.005" thick diamond wheel. The specimen thickness is 0.5", leaving a 0.36" uncracked ligament (about 0.5"-0.36"). The notched bar is placed in a 3-point bend fixture with a 2" load span. The load is applied at 0.02"/min. At the point the crack initiates, the $G_{1C}$ is calculated using a technique developed by J G Williams (*Fracture Mechanics of Polymers*, Ellis Horwood Ltd, chapter 4 (1984)). Both the $G_{1C}$ and the wof can be determined from a single specimen. After the initiation, the loading continues until the entire bar is fractured. The total integrated energy divided by the area of the original uncracked ligament is the wof.

Some embodiments of the abrasive article may be provided with a wof that is greater than that of a conventional abrasive article (CAA). For example, the wof of the abrasive article may be at least about 2% greater than that of the CAA, such as at least about 3% greater, at least about 5% greater, at least about 7% greater, or even at least about 10% greater than that of the CAA. The CAA may comprise at least one of: (a) CSF with a coating having an LOI of less than 2 wt %; (b) CSF without a secondary coating; and (d) CSF having a length of less than 6.3 mm. The wof may be in a range between any of these minimum and maximum values.

In other embodiments, the abrasive article may be compared to a CAA reinforced with a continuous fiber web and no CSF. The abrasive article may have a wof that is within about 5% of that of the CAA, such as within about 10%, or even within about 15% of that of the CAA. The wof may be in a range between any of these minimum and maximum values.

Alternate embodiments of the abrasive article also may be compared to the CAA with regard to strength (psi). For example, the abrasive article may have a strength (psi) that is within about 1% of that of the CAA, such as within about 5%, or even within about 10% of that of the CAA. The strength may be in a range between any of these minimum and maximum values.

Similarly, embodiments of the abrasive article also may be compared to the CAA with regard to toughness ($G_{1C}$). For example, the toughness ($G_{1C}$) of the abrasive article may be within about 1% of that of the CAA, such as within about 5%, or even within about 10% of that of the CAA.

In alternate embodiments, a method of fabricating an abrasive article may comprise making an abrasive mix comprising an organic bond and abrasive particles; forming the abrasive mix into a shape of an abrasive article in a mold; chopping a continuous strand yarn or roving into chopped strand fibers (CSF), at least some of which can have a length of at least about 6.3 mm; depositing the CSF in the mold with the abrasive mix; and then molding the abrasive article such that the CSF forms a reinforcement for the abrasive article.

The continuous strand yarn or roving may have a primary coating and the method may further comprise, prior to chopping, applying a secondary coating on the primary coating. In some versions, chopping may comprise chopping the CSF real time in-situ after forming and before molding.

Other embodiments of a method of fabricating an abrasive article may comprise making an abrasive portion comprising an organic bond and abrasive particles; reinforcing the abrasive article with chopped strand fibers (CSF) coated with a thermoplastic coating having a loss on ignition (LOI) of at least about 2 wt %; and molding the abrasive portion and the CSF to form the abrasive article.

Another embodiments of a method of fabricating an abrasive article may comprise making an abrasive portion comprising an organic bond and abrasive particles; reinforcing the abrasive article with chopped strand fibers (CSF) coated with a primary coating or direct sized coating, and a secondary coating on the primary coating; and molding the abrasive portion and CSF to form the abrasive article.

Still another embodiment of a method of fabricating an abrasive article may comprise making an abrasive portion comprising an organic bond and abrasive particles; reinforcing the abrasive article with chopped strand fibers (CSF) having a length of at least about 6.3 mm; and molding the abrasive portion and CSF to form the abrasive article.

In some versions of the method, the CSF may be provided as a continuous strand yarn or roving, and the method may further comprise chopping the continuous strand yarn or roving into CSF after making the abrasive portion and before molding. In other versions of the method, reinforcing may comprise mixing the CSF in at least a portion of the abrasive article such that the CSF are distributed within the abrasive article. In still another version of the method, reinforcing may comprise placing a layer of the CSF adjacent the abrasive portion such that the abrasive article has a layered structure.

EXAMPLES

Example 1

Each sample of the abrasive composite wheel compositions comprised 57 vol % bond and 38-40 vol % abrasive. In addition, a small amount of furfural (about 1 vol %) or less was used to wet the abrasive particles. The bonds were blended with the furfural-wetted abrasive followed by addition of the reinforcements with only minimal mixing thereafter. The compositions were allowed to age for at least 2 hours before molding. Each mixture was pre-weighed then transferred into a 203 mm diameter mold, spread and then hot pressed at 160° C. for 45 minutes under 352 kg/cm². The wheels were removed from the mold and additionally cured at 200° C. for 18 hours. Flexural specimens having the correct dimensions according to ASTM procedure D790-03 were cut from the wheel and tested in a three point bend with a 5:1 span to depth ratio. Additional specimens having the same dimensions and having a notch across the specimen width were tested according to procedure described above. The formulations for these samples appear in Table 1.

102.3 psi, respectively) of the two conventional samples "OC183" and "OC983". The strength of the new samples exceeded or were within about 10% of the strengths of the conventional samples.

Regarding modulus, sample "PUD (9% LOI)" had an average modulus of 13049 psi, while sample "PUD (2.4% LOI)" had an average strength of 14495 psi. These values compare favorably to the average modulus (13584 psi and 14090 psi, respectively) of the two conventional samples. The modulus of the new samples exceeded or were within about 8% of the modulus of the conventional samples.

Regarding work of fracture (wof), sample "PUD (9% LOI)" had an average wof of 1927, while sample "PUD (2.4% LOI)" had an average wof of 1048. These values compare favorably to the average Wof (1859 and 1485, respectively) of the two conventional samples. The Wof of the new samples exceeded or were within about 45% of the Wof of the conventional samples.

Thus, in some versions, as LOI increases for the thermoplastic-coated reinforcement, strength decreases but Wof increases. An LOI of about 9 wt % achieves both strength and Wof that is not achievable by conventional chopped strands. This performance may be further enhanced by adding additional chopped coated strands (e.g., 4.5 vol %).

TABLE 1

| | | Vol % Identification Number | | | | | |
|---|---|---|---|---|---|---|---|
| | Material | 1 | 7 | 3 | 4 | 5 | 6 |
| Abrasive component | Brown fused alumina-60 grit | 0.2 | 0.2 | 0.2 | 0.2 | 0.19 | 0.19 |
| | Silicon carbide -60 grit | 0.2 | 0.2 | 0.2 | 0.2 | 0.19 | 0.19 |
| Bond | Durez 29344 resin | 0.34 | 0.34 | 0.34 | 0.34 | 0.34 | 0.34 |
| | silicon carbide-600 grit | 0.07 | 0.07 | 0.07 | 0.07 | 0.07 | 0.07 |
| | silicon carbide-220 grit | 0.13 | 0.13 | 0.13 | 0.13 | 0.13 | 0.13 |
| | Lime | 0.03 | 0.03 | 0.03 | 0.03 | 0.03 | 0.03 |
| Reinforcement | OC183 - 4 mm length | 0.03 | | | | | |
| | OC983 - 4 mm length | | 0.03 | | | | |
| | PUD (2.4% LOI) coated yarn-12.5 mm length | | | 0.03 | | 0.045 | |
| | PUD (9% LOI) coated yarn-12.5 mm length | | | | 0.03 | | 0.045 |
| | Average Strength (psil) | 92.5 | 102.3 | 114.7 | 95.8 | 110.6 | 86.4 |
| | Average Modulus (psi) | 13584 | 14090 | 14495 | 13049 | 13784 | 12776 |
| | Average SpWoF | 1859 | 1485 | 1048 | 1927 | 1117 | 2527 |
| | Average G1c | 753 | 699 | 840 | 744 | 839 | 844 |
| | Sp WoF Specimen values | 1930 | 1991 | 709 | 2104 | 1438 | 2210 |
| | | 3250 | 877 | 758 | 1787 | 934 | 1853 |
| | | 2545 | 1529 | 1455 | 1782 | 930 | 2180 |
| | | 1481 | 1294 | 1252 | 1901 | 835 | 1998 |
| | | 1495 | 1078 | 1302 | 1848 | 817 | 3005 |
| | | 1763 | 2599 | 717 | 2153 | 1397 | 3557 |
| | | 1381 | 1054 | 1344 | 1761 | 1695 | 1440 |
| | | 1030 | 1457 | 849 | 2079 | 892 | 3976 |
| | Gic Specmen values | 720 | 672 | 876 | 675 | 975 | 1260 |
| | | 917 | 741 | 678 | 728 | 901 | 811 |
| | | 793 | 706 | 1022 | 928 | 692 | 784 |
| | | 701 | 644 | 998 | 666 | 853 | 794 |
| | | 908 | 689 | 827 | 716 | 707 | 738 |
| | | 588 | 761 | 857 | 756 | 852 | 1049 |
| | | 727 | 686 | 680 | 806 | 998 | 629 |
| | | 670 | 696 | 780 | 675 | 730 | 690 |

Each wheel was tested for strength (psi), toughness ($G_{1C}$) and work of fracture (wof). Strength, wof and toughness were measured parallel to the direction in which the wheel was pressed.

As depicted in Table 1, sample "PUD (9% LOI)" had an average strength of 95.8 psi, while sample "PUD (2.4% LOI)" had an average strength of 114.7 psi. These values compare favorably to the average strengths (92.5 psi and

Example 2

In another experiment, various types of CSF sample wheels were prepared in accordance with Table 2A. Some of the samples were coated, while others were not. These samples did not contain conventional web reinforcements. The samples otherwise were prepared in an identical manner as described in Example 1. As described in Table 2A, the samples in FIG. 9 contained various volumes and sizes, and some included thermoplastic (polyurethane) coatings. Each sample had an LOI of about 15 wt % to about 25 wt %.

TABLE 2A

| Component | 07100201 | 07100202 | 07100203 | 7110601 | 7110602 | 7110603 | 7110604 |
|---|---|---|---|---|---|---|---|
| Extruded alumina 20 grit | 55.68 | 55.68 | 55.68 | 55.68 | 55.68 | 55.68 | 55.68 |
| Durez 29722 | 18.37 | 18.37 | 18.37 | 18.37 | 18.37 | 18.37 | 18.37 |
| Saran | 0.00 | 0.00 | 0.00 | 0.00 | 0.00 | 0.00 | 0.00 |
| PKHP-200 | 0.97 | 0.97 | 0.97 | 0.97 | 0.97 | 0.97 | 0.97 |
| Pyrite | 10.10 | 10.10 | 10.10 | 10.10 | 10.10 | 10.10 | 10.10 |
| Potassium sulfate | 4.19 | 4.19 | 4.19 | 4.19 | 4.19 | 4.19 | 4.19 |
| Lime | 2.52 | 2.52 | 2.52 | 2.52 | 2.52 | 2.52 | 2.52 |
| SiC -800 | 0.00 | 0.00 | 0.00 | 0.00 | 0.00 | 0.00 | 0.00 |
| Fused brown aluminum oxide 220 grit | 2.17 | 2.17 | 2.17 | 0.00 | 0.00 | 0.00 | 0.00 |
| Mineral Wool | 3.00 | 0.00 | 0.00 | 2.17 | 2.17 | 2.17 | 2.17 |
| 4 mm OCF-497 | 3.00 | 0.00 | 0.00 | 6.00 | 3.00 | 3.00 | 0.00 |
| 4 mm Coated Strand | 0.00 | 3.00 | 0.00 | 0.00 | 0.00 | 0.00 | 0.00 |
| 12 mm Coated Strand | 0.00 | 0.00 | 3.00 | 0.00 | 3.00 | 0.00 | 6.00 |
| 25 mm Coated Strand | 0.00 | 0.00 | 0.00 | 0.00 | 0.00 | 3.00 | 0.00 |

Figure 9:
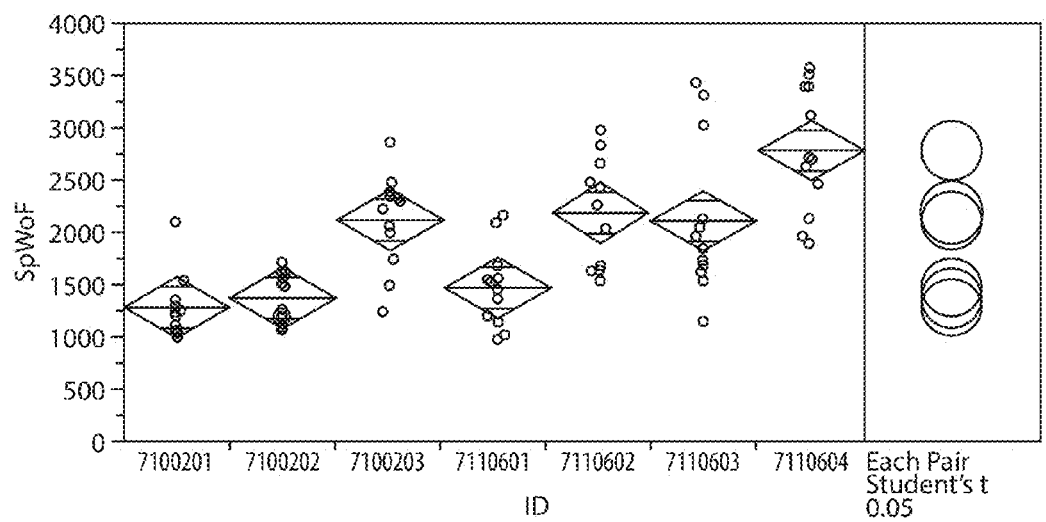

As shown in FIG. 9, the Wof of the 12 mm thermoplastic coated 3 vol % samples is significantly greater (about 60%) than that of the conventional shorter thermoset coated samples. The 4 mm thermoplastic coated samples also performed better than the conventional shorter thermoset coated samples. The Wof of the 12 mm thermoplastic coated 6 vol % samples was up to about 90% greater than that of the conventional 4 mm thermoset coated samples. Overall, the embodiments of the samples outperformed the conventional samples by about 6% to about 90%. All samples had similar strengths.

Example 3

As described in Table 2B, additional samples were prepared to compare wheels with conventional reinforcement webs (samples 711605) to wheels with coated chopped strands or CCS (samples 711606) in a mat or layer. The samples were otherwise identical to each other, and prepared in the same manner as Example 2. One half of the mix was transferred to the mold, spread evenly and the web or the 2" coated yarn was placed/deposited as a mat. The remaining mix was transferred on top of the reinforcement and pressed as described for Example 1.

TABLE 2B

| Component | 7110605 | 7110606 |
|---|---|---|
| Extruded and sintered aluminum oxide 20 grit (vol %) | 55.68 | 55.68 |
| Durez 29722 (vol %) | 18.37 | 18.37 |
| Saran (vol %) | 0.00 | 0.00 |
| PKHP-200 (vol %) | 0.97 | 0.97 |
| Pyrite (vol %) | 10.10 | 10.10 |
| Potassium sulfate (vol %) | 4.19 | 4.19 |
| Lime (vol %) | 2.52 | 2.52 |
| SiC-800 (vol %) | 0.00 | 0.00 |
| Fused brown aluminum oxide 220 grit (vol %) | 0.00 | 0.00 |
| Mineral wool -PMF (vol %) | 2.17 | 2.17 |
| 4 mm OCF-497 (vol %) | 6.00 | 6.00 |
| IPAC Style 24 glass web (g/wheel)) | 20.4 | 0 |
| 50 mm CCS(grams/wheel) | 0.00 | 20.4 |

Figure 8:
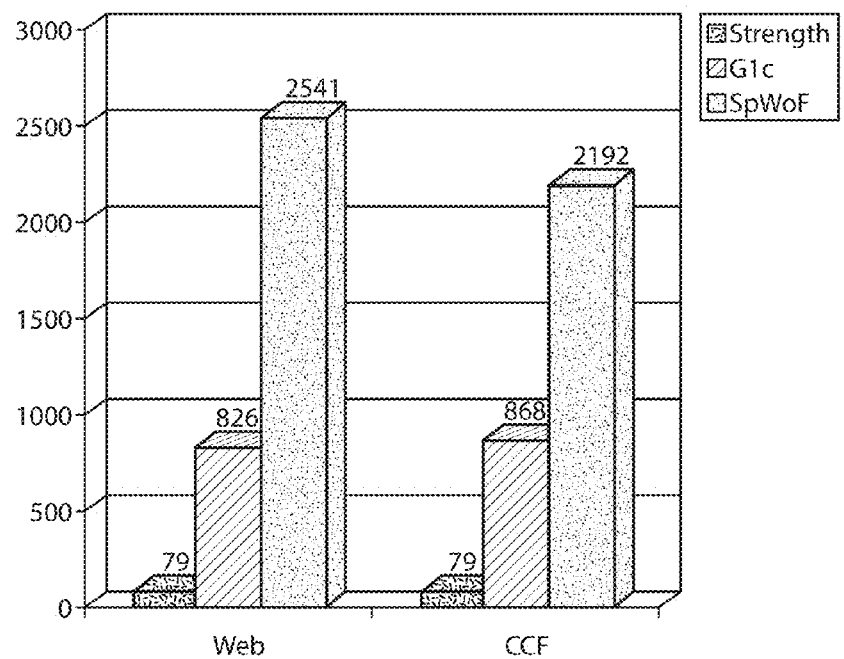
FIGS. 8 and 9 are plots of the performances of conventional abrasive articles and embodiments of abrasive articles.

The test results for the samples of Table 2B are represented in FIG. 8. The coated chopped fiber (CCF) samples had a Wof of about 2192, while the conventional web samples had a Wof of about 2541. Thus, the Wof of the CCF samples were within about 14% of that of the conventional web samples. In addition, the CCF samples had a G1C of about 868, while the conventional web samples had a G1C of about 826. Thus, the G1C of the CCF samples were about 5% better than that of the conventional web samples. Using a three-point bend test, both sets of samples had a strength of about 79. These results indicate that the mechanical properties for abrasive articles with discontinuous short fibers having a thermoplastic secondary coating are comparable to those of abrasive articles with continuous fiber glass strand woven webs at the same overall glass content.

Embodiments of CSF can be an alternative to or supplement for continuous web reinforcements. CSF requires lower labor and resource intensive process than webs. CSF may use a fiber distribution process that consistently delivers the fibers to the mold consistently in the same way. To date, no abrasive wheels have utilized thermoplastic coated fibers having at least an initial length in excess of 0.25 inches and high LOI. An embodiment of this disclosure is to use a continuous strand yarn or roving that is chopped "in situ" (i.e., real time) into discrete or discontinuous fibers during manufacturing of abrasive articles. The fibers may have at least an initial length in excess of 0.25 inches, and may be chopped and placed directly into the mold cavities in real time as the abrasive articles are being fabricated.

This process eliminates the two waste streams mentioned herein to provide a zero fiber waste process. In addition, this process requires a smaller storage footprint in the manufacturing facility, as well as a highly flexible method to manipulate and prescribe wheel properties and performance. Examples of the flexibility in manipulating the wheel properties and performance include changing the chopped length of the CSF, the bundle size, the fiber type, and the fiber amount. Compared to conventional wheels with phenolic-coated web reinforcements, in situ CSF provide comparable strength, fracture toughness, and specific work of fracture.

For example, thermoplastic coated or thermoset coated yarns may be commercially desirable. However, thermoset yarns are inherently stiffer, and hence would result in high loft which would make it difficult to achieve the correct mold fill. Additionally, the stiffer strands give rise to springback, thus introducing undesired porosity into the wheel. In addition, to obtain good wet/out and bonding of the thermoset coating to the matrix resin (or bond), the degree of cure may be precisely controlled, which can be difficult, as thermosets age (cure) with time and temperature. In contrast, properly selected thermoplastics reduce these problems.

As used herein, terms such as "reinforced" or "reinforcement" may refer to discontinuous components of a reinforcing material that is different from the bond and abrasive materials employed to make the bonded abrasive tool. Terms such as "internal reinforcement" or "internally reinforced" indicate that these components are within or embedded in the body of the tool. Background details related to reinforcement techniques and materials are described, for example, in U.S. Pat. No. 3,838,543, which is incorporated herein by reference in its entirety. Reinforced wheels also are described in U.S. Pat. Nos. 6,749,496, and 6,942,561, both of which are incorporated herein by reference in their entirety.

An exemplary binder system may include one or more organic resins, such as phenolic resin, boron-modified resin, nano-particle-modified resin, urea-formaldehyde resin, epoxy resin, polybenzoxazine, polyester resin, isocyanurate resin, melamine-formaldehyde resin, polyimide resin, other suitable thermosetting resins, or any combination thereof.

Specific, non-limiting examples of resins that can be used include the following: the resins sold by Dynea Oy, Finland, under the trade name Prefere and available under the catalog/product numbers 8522G, 8528G, 8680G, and 8723G; the resins sold by Hexion Specialty Chemicals, OH, under the trade name Rutaphen® and available under the catalog/product numbers 9507P, 8686SP, and SP223; and the resins sold by Sumitomo, formerly Durez Corporation, TX, under the following catalog/product numbers: 29344, 29346, and 29722. In an example, the bond material comprises a dry resin material.

An exemplary phenolic resin includes resole and novolac. Resole phenolic resins can be alkaline catalyzed and have a ratio of formaldehyde to phenol of greater than or equal to one, such as from 1:1 to 3:1. Novolac phenolic resins can be acid catalyzed and have a ratio of formaldehyde to phenol of less than one, such as 0.5:1 to 0.8:1.

An epoxy resin can include an aromatic epoxy or an aliphatic epoxy. Aromatic epoxies components include one or more epoxy groups and one or more aromatic rings. An example aromatic epoxy includes epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenyl, 4,4'-(9-fluorenylidene)diphenol, or any combination thereof. The bisphenol can be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F. A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether. In addition, an example of an aromatic epoxy includes epoxy novolac, for example, phenol epoxy novolac and cresol epoxy novolac. Aliphatic epoxy components have one or more epoxy groups and are free of aromatic rings. An example of an aliphatic epoxy includes glycidyl ether of C2-C30 alkyl; 1,2 epoxy of C3-C30 alkyl; mono or multi-glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols. In one embodiment, the aliphatic epoxy includes one or more cycloaliphatic ring structures.

Depending upon the catalyzing agents and type of polymer, the binder system can be thermally curable to form the binder system. The binder system can also include other components such as solvents, plasticizers, crosslinkers, stabilizers, dispersants, curing agents, reaction mediators and agents for influencing the fluidity of the dispersion.

Still other embodiments may include one or more of the following items.

Item 1. An abrasive article, comprising:

an abrasive portion having an organic bond and abrasive particles; and a reinforcement comprising chopped strand fibers (CSF) coated with a thermoplastic coating having a loss on ignition (LOI) of at least about 2.4 wt %.

Item 2. An abrasive article, comprising:

an abrasive portion having an organic bond and abrasive particles; and a reinforcement comprising chopped strand fibers (CSF) coated with a primary coating and a secondary coating on the primary coating.

Item 3. An abrasive article, comprising:

an abrasive portion having an organic bond and abrasive particles; and a reinforcement comprising chopped strand fibers (CSF), at least some of which have a length of at least about 6.3 mm.

Item 4. An abrasive article, comprising:

an abrasive portion having an organic bond and abrasive particles;

a reinforcement comprising chopped strand fibers (CSF); and the abrasive article has a work of fracture (wof) that is at least about 1% greater than that of a conventional abrasive article (CAA), and the CAA comprises at least one of:

(a) CSF with a coating having an LOI of less than 2 wt %;

(b) CSF without a secondary coating; and (c) CSF having a length of less than 6.3 mm.

Item 5. The abrasive article of any one of items 1, 3 and 4, wherein the CSF has a primary coating and the thermoplastic coating is a secondary coating on the primary coating.

Item 6. The abrasive article of any one of items 1, 3 and 4, wherein the CSF further comprises a direct sized coating, and the thermoplastic coating is a secondary coating on the direct sized coating.

Item 7. The abrasive article of any of these items, wherein the direct sized coating has an LOI of less than about 2 wt %.

Item 8. The abrasive article of any of these items, wherein the CSF comprises a yield in a range of about 134 TEX (3700 yd/lb) to about 1830 TEX (271 yd/lb).

Item 9. The abrasive article of any of these items, wherein the CSF comprises a yield of at least 125 TEX, at least 250 TEX, at least 500 TEX, at least 750 TEX, at least 1000 TEX, at least 1500 TEX, and not greater than about 2000 TEX, not greater than about 1500 TEX, not greater than about 1000 TEX, not greater than about 750 TEX, not greater than about 500 TEX, not greater than about 250 TEX.

Item 10. The abrasive article of any of these items, wherein the abrasive article does not have a fiber glass web, fabric reinforcement, and/or continuous fiber reinforcement, such that the abrasive article is reinforced only by the CSF.

Item 11. The abrasive article of any of these items, wherein the CSF have a maximum length, and at least some of the CSF are within about 10% of the maximum length, within about 5% of the maximum length, about 90% of the CSF are within about 10% of the maximum length, about 95% of the CSF are within about 10% of the maximum length, or about 95% of the CSF are within about 5% of the maximum length.

Item 12. The abrasive article of any of these items, wherein a length of at least some of the CSF is at least about 6.3 mm, at least about 7 mm, at least about 8 mm, at least about 10 mm, at least about 12 mm, at least about 15 mm, at least about 20 mm, and not greater than about 125 mm, not greater than about 100 mm, not greater than about 75 mm, not greater than about 50 mm, not greater than about 40 mm, or not greater than about 30 mm.

Item 13. The abrasive article of any of these items, wherein the coating comprises a high hydrogen-bonding capacity polymer, wherein the thermoplastic coating comprises a thermoplastic polymer, such as one or predominantly comprising -(A-B)- made with monomers A and B, where the B segment of the polymer contains at least one $XH_n$ functionalities, where X=O or N or S, and n=1 or 2.

Item 14. The abrasive article of any of these items, wherein the CSF have a coating comprising at least one of a thermoplastic, thermoplastic novolac, phenoxy, polyurethane, or any combination thereof.

Item 15. The abrasive article of any of these items, wherein the coating is substantially not cross-linked.

Item 16. The abrasive article of any of these items, wherein less than about 5% of the coating is cross-linked, or less than about 10% of the coating is cross-linked.

Item 17. The abrasive article of any of these items, wherein the coating comprises a LOI of at least about 2 wt %, at least about 3 wt %, at least about 5 wt %, at least about 7 wt %, at least about 9 wt %, at least about 12 wt %, at least about 15 wt %, and not greater than about 25 wt %, not greater than about 20 wt %, not greater than about 15 wt %, or not greater than about 12 wt %.

Item 18. The abrasive article of any of these items, wherein the abrasive article has a work of fracture (wof) that is at least about 1% greater than that of a conventional abrasive article (CAA), at least about 2% greater, at least about 3% greater, at least about 5% greater, at least about 7% greater, or at least about 10% greater than that of the CAA, and the CAA comprises:
  (a) CSF with a coating having an LOI of less than 2 wt %;
  (b) CSF without a secondary coating; or
  (d) CSF having a length of less than 6.3 mm.

Item 19. The abrasive article of any of these items wherein, compared to a conventional abrasive article (CAA) reinforced with a continuous fiber web and no CSF, the abrasive article has:
  a work of fracture (Wof) that is within about 5% of that of the CAA, within about 10%, or within about 15% of that of the CAA.

Item 20. The abrasive article of any of these items wherein, compared to a conventional abrasive article (CAA) reinforced with a continuous fiber web and no CSF, the abrasive article has:
  a strength (psi) that is within about 1% of that of the CAA, within about 5%, or within about 10% of that of the CAA.

Item 21. The abrasive article of any of these items wherein, compared to a conventional abrasive article (CAA) reinforced with a continuous fiber web and no CSF, the abrasive article has:
  a toughness (G1C) that is within about 1% of that of the CAA, within about 5%, or within about 10% of that of the CAA.

Item 22. The abrasive article of any of these items, wherein the CSF are dispersed in at least a portion of the abrasive article.

Item 23. The abrasive article of any of these items, wherein the CSF are substantially randomly distributed throughout the abrasive portion.

Item 24. The abrasive article of any of these items, wherein the abrasive article has an axial thickness, and the CSF has a maximum length that is not greater than the axial thickness.

Item 25. The abrasive article of any of these items, wherein the CSF are formed as a discrete layer in the abrasive mix.

Item 26. The abrasive article of any of these items, wherein the discrete layer of comprises a plurality of discrete layers that are axially separated from each other by portions of the abrasive mix.

Item 27. The abrasive article of any of these items, wherein the discrete layer is a sintered mat of the CSF such that the CSF are integral.

Item 28. The abrasive article of any of these items, wherein the abrasive article is a wheel having an axis, an outer diameter (OD) and an inner diameter (ID), and a maximum length of the CSF is not greater than (OD−ID)/2.

Item 29. The abrasive article of any of these items, wherein the abrasive article further comprises at least one web formed from continuous fiber reinforcement, such that the abrasive body is reinforced by the CSF and the web.

Item 30. The abrasive article of any of these items, wherein the abrasive article comprises a volume percentage of the CSF of at least about 1 vol %, at least about 2 vol %, at least about 3 vol %, at least about 4 vol %, at least about 5 vol %, at least about 6 vol %, at least about 9 vol %, and not greater than about 25 vol %, not greater than about 20 vol %, not greater than about 15 vol %.

Item 31. The abrasive article of any of these items, wherein the abrasive article comprises about 25 vol % to about 50 vol % of the organic bond, about 40 vol % to about 70 vol % of the abrasive particles, and about 6 vol % to about 12 vol % of the CSF.

Item 32. A method of fabricating an abrasive article, comprising:
  making an abrasive mix comprising an organic bond and abrasive particles;
  forming the abrasive mix into a shape of an abrasive article in a mold;
  chopping a continuous strand yarn or roving into chopped strand fibers (CSF), at least some of which have a length of at least about 6.3 mm;
  depositing the CSF in the mold with the abrasive mix; and then
  molding the abrasive article such that the CSF forms a reinforcement for the abrasive article.

Item 33. The method of any of these items, wherein the continuous strand yarn or roving has a primary coating and, prior to chopping, further comprising applying a secondary coating on the primary coating.

Item 34. The method of any of these items, wherein chopping comprises chopping the CSF real time in-situ after forming and before molding.

Item 35. A method of fabricating an abrasive article, comprising:
  making an abrasive portion comprising an organic bond and abrasive particles;
  reinforcing the abrasive article with chopped strand fibers (CSF) coated with a thermoplastic coating having a loss on ignition (LOI) of at least about 2 wt %; and
  molding the abrasive portion and CSF to form the abrasive article.

Item 36. A method of fabricating an abrasive article, comprising:
  making an abrasive portion comprising an organic bond and abrasive particles;
  reinforcing the abrasive article with chopped strand fibers (CSF) coated with a primary coating and a secondary coating on the primary coating; and
  molding the abrasive portion and CSF to form the abrasive article.

Item 37. A method of fabricating an abrasive article, comprising:
  making an abrasive portion comprising an organic bond and abrasive particles;
  reinforcing the abrasive article with chopped strand fibers (CSF), at least some of which have a length of at least about 6.3 mm; and
  molding the abrasive portion and CSF to form the abrasive article.

Item 38. The method of any these items, wherein the CSF are provided as a continuous strand, yarn or roving, and further comprising chopping the continuous strand yarn or roving into CSF after making the abrasive portion and before molding.

Item 39. The method of any these items, wherein reinforcing comprises mixing the CSF with at least a portion of the abrasive article such that the CSF are distributed within the abrasive article.

Item 40. The method of any these items, wherein reinforcing comprises placing a layer of the CSF adjacent the abrasive portion such that the abrasive article has a layered structure.

Item 41. The abrasive article of any of these items, wherein the abrasive article has a work of fracture (wof) that is at least about 5% greater than that of a conventional abrasive article (CAA), at least about 10% greater, at least about 20% greater, at least about 40% greater, at least about 60% greater, at least about 70% greater than that of the CAA, not greater than 150%, not greater than 125%, not greater than 100%, and the CAA comprises at least one of:
  (a) CSF with a coating having an LOI of less than 2 wt %;
  (b) CSF without a secondary coating;
  (c) CSF having a length of less than 6.3 mm; and
  (d) thermoset coated CSF.

Item 42. An abrasive article, comprising:
  an abrasive portion having an organic bond and abrasive particles; and a reinforcement, comprising at least one of:
  (a) chopped strand fibers (CSF) coated with a thermoplastic coating having a loss on ignition (LOI) of at least about 2.4 wt %;
  (b) CSF coated with a primary coating and a secondary coating on the primary coating; and
  (c) CSF, at least some of which have a length of at least about 6.3 mm.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An abrasive article, comprising:
  an abrasive portion having an organic bond and abrasive particles; and
  a reinforcement comprising chopped strand fibers (CSF) coated with a primary coating and a secondary coating on the primary coating, wherein the primary coating comprises a direct sized thermoset coating having a loss on ignition (LOI) of less than about 2 wt % and the secondary coating comprises a thermoplastic coating having a loss on ignition (LOI) of at least about 2.4 wt %, and wherein at least a portion of the chopped strand fibers (CSF) are in direct contact with each other.

2. The abrasive article of claim 1, wherein the thermoset coating comprises a phenolic resin.

3. The abrasive article of claim 1, wherein the thermoplastic coating comprises polyurethane.

4. The abrasive article of claim 1, wherein the CSF comprises a yield in a range of about 134 TEX (3700 yd/lb) to about 1830 TEX (271 yd/lb).

5. The abrasive article of claim 1, wherein the thermoplastic coating comprises at least one of thermoplastic novolac, phenoxy and polyurethane.

6. The abrasive article of claim 1, wherein less than about 10% of the thermoplastic coating is cross-linked.

7. The abrasive article of claim 1, wherein the CSF are at least one of:
   (a) dispersed in at least a portion of the abrasive article; and
   (b) formed as at least one discrete layer in the abrasive mix.

8. The abrasive article of claim 1, wherein the abrasive article is a wheel having an axis, an outer diameter (OD) and an inner diameter (ID), and a maximum length of the CSF is not greater than (OD−ID)/2.

9. The abrasive article of claim 1, wherein the abrasive article comprises a volume percentage of the CSF of at least about 1 vol %, and not greater than about 25 vol %.

10. The abrasive article of claim 1, wherein the abrasive article comprises about 25 vol % to about 50 vol % of the organic bond, about 40 vol % to about 70 vol % of the abrasive particles, and about 6 vol % to about 12 vol % of the CSF.

11. The abrasive article of claim 1, wherein the secondary coating is not cross-linked.

12. The abrasive article of claim 1, wherein at least some of the chopped strand fibers (CSF) have a length of at least about 6.3 mm.

13. The abrasive article of claim 12, wherein the abrasive article comprises a volume percentage of the CSF of at least about 1 vol %, and not greater than about 25 vol %.

* * * * *